United States Patent
Deligiannis et al.

(10) Patent No.: US 9,817,417 B2
(45) Date of Patent: Nov. 14, 2017

(54) GENERATING EVENT ANTICIPATION PARAMETERS IN ADVANCE OF A DEMAND RESPONSE EVENT

(71) Applicant: Energate Inc, Ottawa (CA)

(72) Inventors: Jorge Deligiannis, Ottawa (CA); Juan Diaz, Ottawa (CA)

(73) Assignee: Energate Inc, Ottawa (CA)

( * ) Notice: Subject to any disclaimer, the term of this patent is extended or adjusted under 35 U.S.C. 154(b) by 704 days.

(21) Appl. No.: 14/230,878

(22) Filed: Mar. 31, 2014

(65) Prior Publication Data

US 2015/0277465 A1    Oct. 1, 2015

(51) Int. Cl.
  *G05F 1/66*   (2006.01)
  *G05D 23/19*  (2006.01)
  *F24F 11/00*  (2006.01)

(52) U.S. Cl.
  CPC ............ *G05F 1/66* (2013.01); *F24F 11/0009* (2013.01); *F24F 11/0012* (2013.01); *G05D 23/1923* (2013.01); *F24F 2011/0046* (2013.01); *F24F 2011/0075* (2013.01)

(58) Field of Classification Search
  None
  See application file for complete search history.

(56) References Cited

U.S. PATENT DOCUMENTS

| 8,386,087 | B2 | 2/2013 | Spicer et al. |
| 8,538,586 | B2 | 9/2013 | Amundson et al. |
| 8,626,354 | B2 | 1/2014 | Walter et al. |
| 2012/0091213 | A1 | 4/2012 | Altonen et al. |
| 2012/0091804 | A1 | 4/2012 | Altonen et al. |
| 2012/0305661 | A1 | 12/2012 | Malchiondo et al. |
| 2012/0323393 | A1* | 12/2012 | Imhof .................... G05B 15/02 700/297 |
| 2013/0018513 | A1 | 1/2013 | Metselaar |
| 2013/0085614 | A1 | 4/2013 | Wenzel et al. |
| 2013/0282193 | A1* | 10/2013 | Tyagi ..................... H02J 3/008 700/291 |
| 2014/0277769 | A1* | 9/2014 | Matsuoka ............. G06Q 50/06 700/278 |

FOREIGN PATENT DOCUMENTS

| CA | 2744785 | 1/2012 |
| EP | 2407837 A2 | 1/2012 |

* cited by examiner

*Primary Examiner* — Eric C Wai
(74) *Attorney, Agent, or Firm* — Gowling WLG (Canada) LLP; Mark Sprigings

(57) ABSTRACT

A method and system for intelligent demand response by a load controller device connected to a load is provided. Demand response events generated by utilities can generate energy conservation however they can provide demand subpeaks during the event and can impact user comfort. In order to improve the energy profile and user comfort one or more event parameters from the DR event are generated. One or more temperature setpoints of the load controller device are modified to provide smooth setpoint transition between temperature setpoints using the generated one or more event parameters to shape electricity demand of the load to reduce an expected demand subpeak during the DR event. The modified one or more temperature setpoints can be applied at an associated time to control the load.

18 Claims, 7 Drawing Sheets

GENERATING EVENT ANTICIPATION PARAMETERS IN ADVANCE OF A DEMAND RESPONSE EVENT

TECHNICAL FIELD

The present disclosure relates to energy conservation and in particular to load controller device response to demand response events from the electricity utilities.

BACKGROUND

Electrical utilities can utilize time of use demand response (DR) events in an attempt to reduce peak loads on a utility network by providing demand setpoint changes or pricing changes to modify the operation of the associated devices or incentivize users to modify their consumption. DR events are generated by utilities to control changes in electricity usage by end-use customers from their normal consumption patterns and can be used at times when system reliability is jeopardized due to high consumption potentially straining the electricity grid or generation resources. The response of the load, such as heating ventilation air conditioning (HVAC) equipment or water heaters, to the event can decrease overall load on the electricity grid, however the period of the event may result in additional load peaks or subpeaks during the event as loads reach setpoint dictated by the event. The sub-peak can have an impact on the network if a large number of loads reach the dictated event offset setpoint at the same time. In addition, the setpoints determined by the demand response event may also have an undesired impact on user comfort during the event resulting in a significant drop or increase in temperature.

Accordingly, systems and methods that enable improved intelligent demand response remain highly desirable.

BRIEF DESCRIPTION OF THE DRAWINGS

Further features and advantages of the present disclosure will become apparent from the following detailed description, taken in combination with the appended drawings, in which.

It will be noted that throughout the appended drawings, like features are identified by like reference numerals.

DETAILED DESCRIPTION

Figure 1:
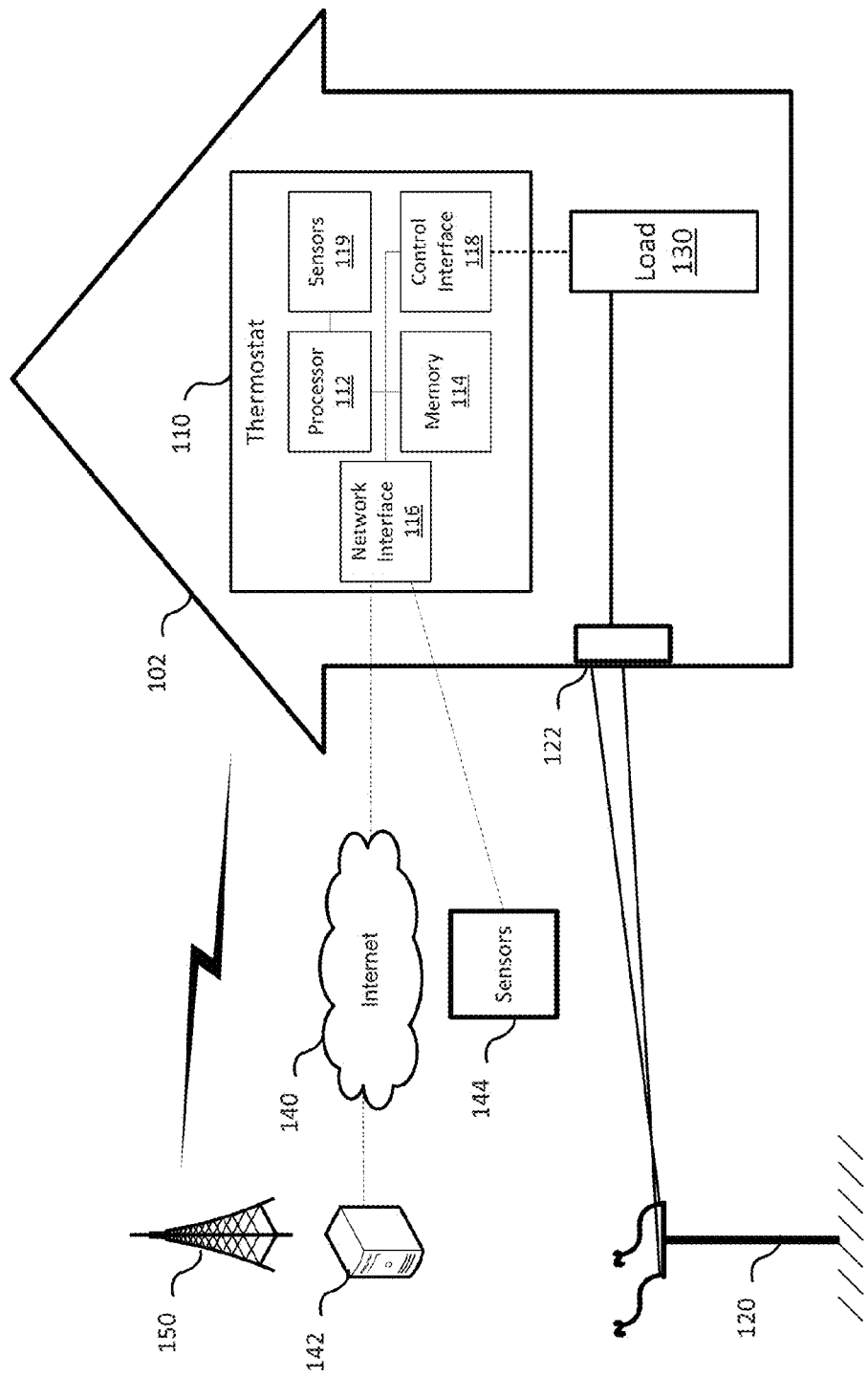
FIG. 1 shows a representation of a system for load control using intelligent demand response.

Embodiments are described below, by way of example only, with reference to FIGS. 1-7.

In accordance with an aspect of the present disclosure there is provided a method of intelligent demand response by a load controller device connected to a load, the method comprising: receiving a demand response (DR) event from a utility providing electricity to the load; generating one or more event parameters from the DR event; modifying one or more temperature setpoints of the load controller device to provide smooth setpoint transition between temperature setpoints using the generated one or more event parameters to shape electricity demand of the load to reduce an expected demand subpeak during the DR event; and applying the modified one or more temperature setpoints at an associated time to control the load.

In accordance with another aspect of the present disclosure there is provided a load controller device for providing intelligent demand response the load controller comprising: a load interface for communicating with a load; a network interface for receiving demand response event from a utility providing electricity to the load; a temperature sensor for determining a temperature associated with the load; and a processor coupled to the load interface, network interface and temperature sensor, the processor for controlling the load based by applying temperature setpoints, the processor generating one or more event parameters from the DR event and modifying one or more temperature setpoints of the load controller device to provide smooth setpoint transition between temperature setpoints using the generated one or more event parameters to shape electricity demand of the load to reduce an expected demand subpeak during the DR event.

In accordance with still yet another aspect of the present disclosure there is provided a computer readable memory containing instructions when executed by a processor provide intelligent demand response by a load controller device connected to a load, the instructions for: receiving a demand response (DR) event from a utility providing electricity to the load; generating one or more event parameters from the DR event; modifying one or more temperature setpoints of the load controller device to provide smooth setpoint transition between temperature setpoints using the generated one or more event parameters to shape electricity demand of the load to reduce an expected demand subpeak during the DR event; and applying the modified one or more temperature setpoints at an associated time to control the load.

Electrical utilities can conveniently manage energy use and reduce peak demand by adjusting consumer loads to reduce consumption during peak usage hours or using time of use pricing. The utility wirelessly signals a controller device of a load, such as for example a thermostat coupled to HVAC equipment, to change a heating or cooling setpoint or provide updated pricing events which can impact setpoints. Demand response event messages are typically one way signals from the utility to the load control switch using technology such as one-way Very High Frequency (VHF), paging, or frequency modulation radio data system (FM RDS) broadcasts to communicate the event. Alternatively other types of networking may be supported by two-way communication wired or wireless systems such as Ethernet, DSL, cable, Zigbee™ or Wi-Fi to interface with smart meter or larger utility mesh network to receive event messages. The controller receives the demand response event message and modifies programming to change a temperature setpoint to reduce the demand for electricity. The response of the load to a DR event can reduce consumption during the peak period, however the DR event can result in a subpeak during the event as the modified setpoint is reached. When many loads reach the setpoint the resulting subpeak can have an impact on network operation and therefore IDR can be utilized to manage the subpeak response.

FIG. 1 shows a representation of system for load control using an intelligent demand response. In this example the load 130 may be a HVAC component such as a furnace or an air conditioner in a residence 102. An electrical distribution panel 122 receives power from a utility 120 and is coupled to the load 130. The thermostat 110 has at least a processor 112 coupled to a network interface for receiving commands from the utility 150, a control interface 118 for controlling the load 130 and a memory 114 containing instructions for executing heating and cooling schedules and controlling associated equipment. The control interface may be a directly wired interface such as 24 VAC HVAC based interface, digital interface, or a wireless interface. The network interface 116 may also be connected to a network such as the Internet 140 for receiving weather or pricing information from a service or server 142. Interior sensors 119 for determining interior parameters such as temperature, humidity or other environmental factors are provided to impact the temperature setpoint. In addition, one or more remote sensors 144 may be utilized to determine outside environmental factors. Weather and temperature information may be utilized for predicting heating and cooling rates of the residence 102 to adjust pre-cooling, pre-heating and ramping rates. The instructions stored in the memory 114 also include programming for responding to pricing or demand response events received from the utility. The utility can provide a DR event message, or load control event, wirelessly via a distribution network 150 through VHF, paging, or FM RDS signal broadcast to a desired service area or through two-way signals transmitted from Advanced Meter Infrastructure enabled "Smart Meters", or through two-way signals transmitted from a gateway device in or near the premises. The DR event message identifies one or more time periods for which the load is requested to demand lower electricity consumption by changing a temperature setpoint either directly or indirectly. The DR event message, or demand response load control (DRLC) message, may define an offset in temperature or may utilize pricing variables to impact the usage of the load. The time periods may define a single instance or a schedule of time periods to which the event applies. In response to the event the thermostat, or controller, modifies the programming schedule to reduce electrical demand. In order to improve comfort to the user and improve the load response during the demand event an intelligent demand response (IDR) is disclosed. IDR utilizes event anticipation pre-heating or pre-cooling, event anticipation ramping and event ramping or event smoothing to modify the thermostat or controller schedule to improve load response and user comfort. Non-peak and lower costs periods can be used to leverage the heating and cooling properties of the household and ramp rate of the load to reduce peaks during the event in consumption and temperature.

Pre-heating or pre-cooling before price events utilizes a home's thermal inertia to store energy during off-peak periods and use it during high price periods to reduce temperature differential during a demand response event. Characteristics of heating and cooling rates in addition to external temperature or weather patterns can be utilized to optimize IDR process. Event ramping can be used by the utility to prevent a synchronous shut down of the majority of the homes HVAC being turned off suddenly at the start of the event and to minimize possible subpeak occurrence during the event period. By making the event ramping time remotely controllable, enables utilities to have the ability to shift the peak of the consumption reduction. In addition, event smoothing can be utilized to provide a transition into a demand event gradually reducing load demand and extending future consumption peaks when setpoints are reached.

Figure 2:
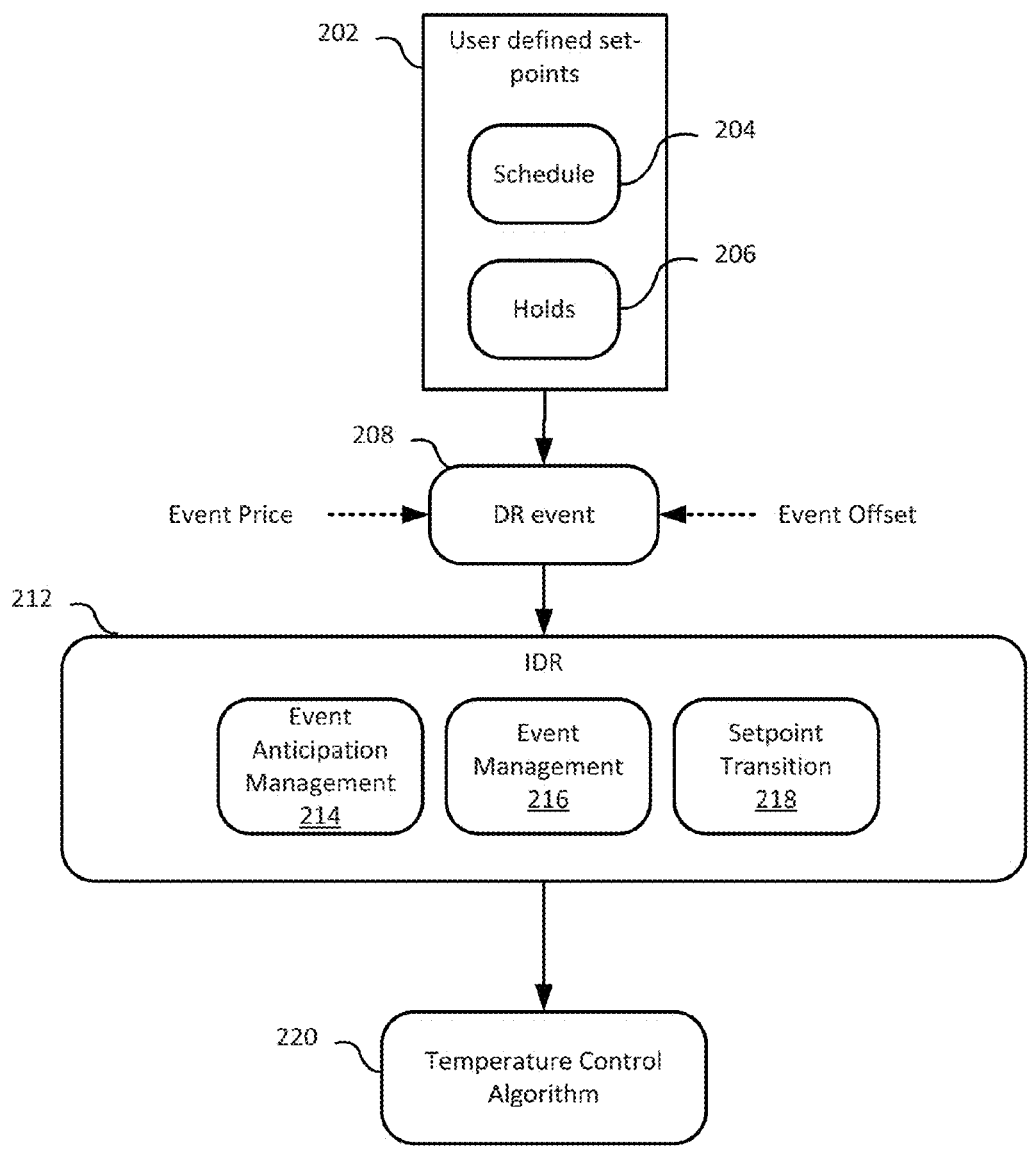
FIG. 2 shows a representation of setpoint logic.

FIG. 2 show an example of setpoint calculation logic utilized in a control device such as a thermostat. Defined temperature setpoints 202 may be defined in a schedule 204 or associated with defined holds 206. The temperature setpoints may define one or more start and stop times and a setpoint that have be programmed by the user or learned by the controller. A DR event 208 is received by the controller and may define an offset or a price change as a value or parameters. Alternatively the DR event may define offset derived from a price tier. Event parameters can be defined from the DR event such as an event offset (EO), an event start (ES) time and event length (EL) from the DR event. In order to provide smooth setpoint transition the intelligent demand response 212 utilizes the DR event parameters to determine one or more event parameters for modifying the operation of the controller device. From the parameters event anticipation management block 214 determines the time that pre-cooling or pre-heating of the house should be performed before the start of the event (ES), the event anticipation ramping time and the offset for the anticipation event. Parameters for the event management block 216 define the event offset derived from the DR event message, event ramping time. Each setpoint generated, besides providing temperature setpoints, will provide a time to setpoint parameter that is used by the ramping block. The conservation offset that is generated based upon the DR event might be positive (for the cooling setpoint) or negative (for the heating setpoint). The event management block 216 can also manage conflicts between multiple overlapping anticipation events to select and optimal offset.

Setpoint transition 218 can then be used to determine transition between setpoints and to smooth transition between setpoint and ramping events. The temperature control algorithm 220 can then utilize the parameters setpoint generated by the IDR 212 and performing the schedule transitions to achieve improved heating and cooling functions of the structure.

The DR event may be defined by tiers that identify the setbacks required during the event. For example six tiers may be provided with tier having a maximum setback offset between 0 and 'MaxOffset' as shown in Table 1. The user may be able to change the maximum setback offset from the user interface of the thermostat or remotely by for example a web portal for pricing events. During price events the conservation setback offset can be a percentage of the 'MaxOffset' depending on the user selected comfort level as shown in Table 2.

TABLE 1

Examples of default maximum setback offsets per tier.

| Tier | Maximum savings setback offset |
|---|---|
| 1 | 0.0° C. Should be always 0 as Tier 1 means lowest price. |
| 2 | 1.1° C.-2° F. (MaxOffset for tier 2) |
| 3 | 2.2° C.-4° F. (MaxOffset for tier 3) |
| 4 | 3.3° C.-6° F. (MaxOffset for tier 4) |
| 5 | 4.4° C.-8° F. (MaxOffset for tier 5) |
| 6 | 5.6° C.-10° F. (MaxOffset for tier 6) |

TABLE 2

Conservation setback offset percentage.

| Comfort Level | | % of Maximum setback offset |
|---|---|---|
| 0 | Maximum Comfort | 0% |
| 1 | | 25% |
| 2 | Balanced | 50% |
| 3 | | 75% |
| 4 | Maximum Savings | 100% |

The comfort level setting may be user selected or learned by the controller based upon user changes to temperature settings during previous events.

Figure 3:
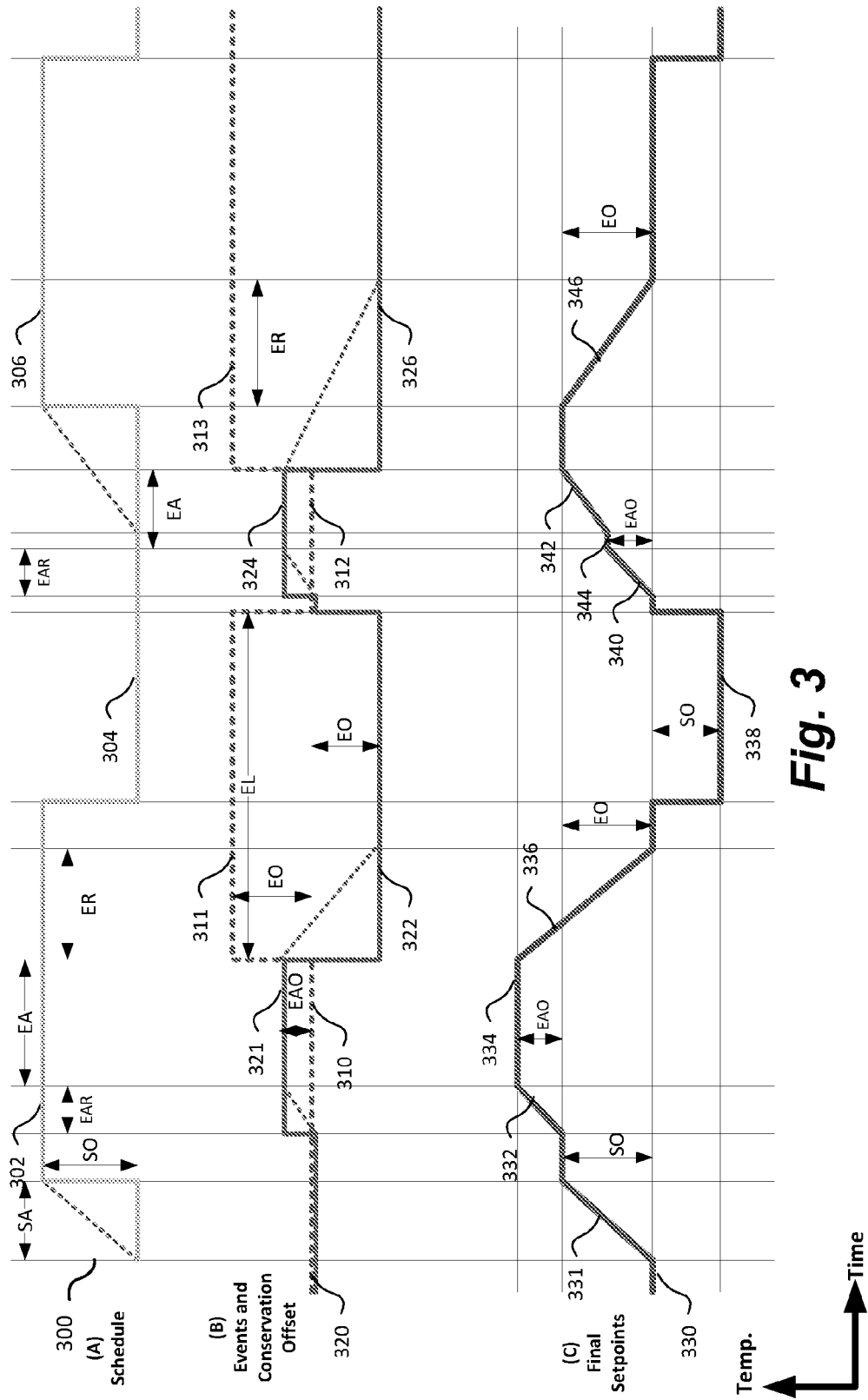
FIG. 3 shows a conservation setpoint calculation using intelligent demand response.

The following event parameters are used to determine the intelligent demand response as referenced in FIG. 3.

| Parameter Name | Description |
|---|---|
| SA—Schedule Anticipation | Time to reach the desired setpoint. The anticipation may be determined based upon equipment capacity and/or a determined trend of heating/cooling performance, time of day, external environmental parameters or weather predictions |
| SO—Schedule Offset | Difference between an initial temperature and requested setpoint value. |
| EA—Event Anticipation time | Number of seconds that the system should pre-cool or pre-heat the house before the start of the event (ES) |
| EAO—Event Anticipation Offset | Number of degrees (Celsius/Fahrenheit) that the system should offset the current user defined temperature setpoint to pre-cool or pre-heat. This is a negative number in cool mode and a positive number on heat mode. |
| EAR—Event Anticipation Ramping time | Allowed time to reach EAO starting from 0 following a linear sequence. Represents the number of seconds the system has to move the event offset from 0 to EAO. |
| EO—Event Offset | Number of degrees (Celsius/Fahrenheit) that the system should offset the current user defined temperature setpoint to save energy during the event. This is a positive number in cool mode (less cooling) and a negative number on heat mode (less heating). |
| EL—Event Length | Duration of the event in seconds. |
| ER—Event Ramping | Number of seconds from the start of the event that the system has to reach EO. |
| ES—Event Start | UTC time of the event starting point. (Seconds since Jan 1, 2000 00:00:00) |

FIG. 3(A) shows a representation of a schedule 300 that would be programmed in a thermostat. In the schedule three setpoint changes 302, 304, 306 to the temperature as a function of time. For example setpoint 302 may define a temperature of 21° C., setpoint 304 may define a temperature of 18° C. and setpoint 306 may define a setpoint of 21° C. FIG. 3(B) shows demand response event 310 where the pricing or offset changes 311, 312, 313, 316 are provided in a demand response event message. For example 310 and 314 may define a lower electricity rate, whereas 311 and 313 may define a higher electricity rate at specified times. In response to the events conservation offsets 320 are determined 321, 322, 324 and 326. The pre-heating or pre-cooling functions and event ramping take advantage of lower electricity rates or lower load demand and can extend the time to reach the prescribed setpoint shifting load requirements. As shown in FIG. 3(C) the conservation offsets are applied to the schedule to produce final set points 330. Ramping events 331, 332, 336, 340, 342, 344 and 346 to transition between target setpoints and to provide pre-cooling and heating to reduce the amount impact of flail an event offset. One or more of the level setpoints 334, 344 for the pre-heating or cooling may be higher (heating) or lower (cooling) than the scheduled offset. For example the setpoint 334 may be set to 23° C. at 11:30 am to increase the heat in the structure in anticipation of the offset event and to account for cooling rate of the structure or external weather factors.

In order to generate the final setpoints the IDR determines pre-heating or pre-cooling factors temperature and times in addition to ramping rates either dynamically or based upon utility or user defined parameters. The ability to modify the temperature offset associated with Maximum Temperature Adjustment can be configurable by the user. For example any one value can be changed in 0.5° C. (or 1.0° F.) increments from 0 to the maximum value (5.6° C. or 10.0° F.).

In the description, all examples and formulas are for heating setpoint calculations—in cooling positive values become negative and vice versa. When a tier based event (tier index is different than 0) is received, the thermostat can calculate the Event Offset (EO) using the following equation:

$$EO = \frac{MaxOffset(\text{tier}) \times \text{Comfort Level(user selected)}}{\text{Comfort Level (Max. Savigs)}}$$

When a valid event with a tier index higher than a maximum tier is received, the conservation offset for the event can be calculated as the tier was at the maximum. When a non-tier based event (tier index is 0) is received, the thermostat can calculate a tier number (convert to tier based system) based on the ratio between the event price and the "base price" using a multiplier ratio table. Each valid event that the thermostat knows of (received and stored inside internal tables) can provide, at any given time, two parameters that will be later used for setpoint calculation defined by Event Offset and time to offset (TTO).

Figure 4:
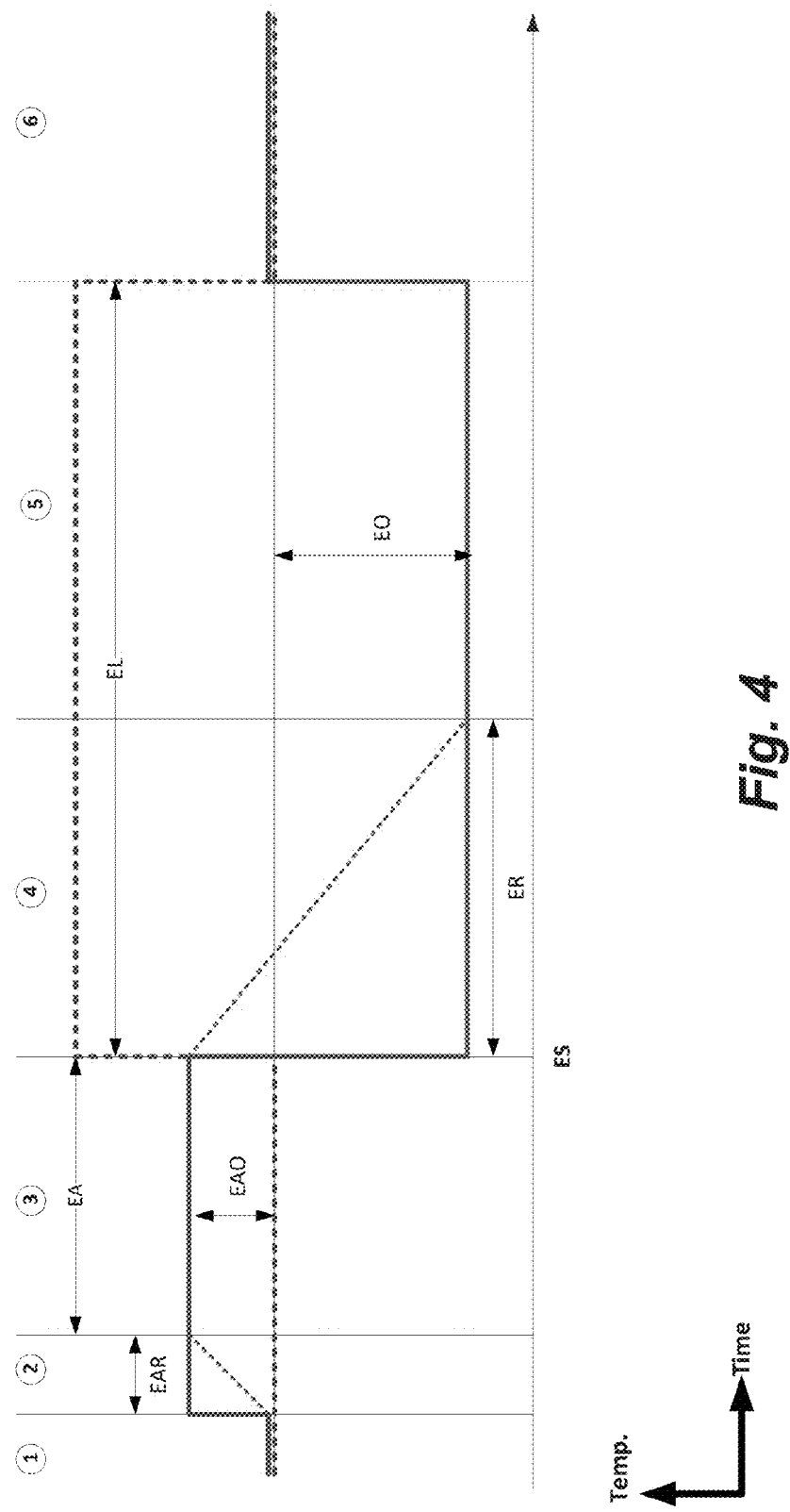
FIG. 4 shows an example of the impact of demand events on a schedule.

Referring to FIG. 4, the following table presents how the event processing logic can calculate these parameters at each step of the event.

| Step | Condition | Offset and time to offset (TTO) |
|------|-----------|--------------------------------|
| 1 | t < (ES − (EA + EAR)) | Offset = 0<br>TTO = 0 |
| 2 | (ES − (EA + EAR)) ≤ t < (ES − EA) | Offset = EAO<br>TTO = (ES − EA) − t |
| 3 | (ES − EA) ≤ t < ES | Offset = EAO<br>TTO = 0 |
| 4 | ES ≤ t < (ES + ER) | Offset = EO<br>TTO = (ES + ER) − t |
| 5 | (ES + ER) ≤ t < (ES + EL) | Offset = EO<br>TTO = 0 |
| 6 | t ≥ (ES + EL) | Offset = 0<br>TTO = 0 |

During steps 2 and 3, event anticipation must be disabled (Offset=0, TTO=0) if:
 A price event is in progress and its event offset is greater than EO of the event at step 2 or 3.
 A temporary hold is in progress and it started after ES−(EA+EAR).
 Thermostat is in Schedule OFF mode and the target temperature is changed after ES−(EA+EAR).
 EA is less than 15 min. See rules for EA calculation.

The Event Anticipation time (EA) is the minimum between EL/2 (half of the event duration) and the maximum user configured event anticipation time:

$$EA = \text{MIN}\left(\frac{EL}{2}, EA_{MAX}\right)$$

The Event Anticipation Ramping time (EAR) is calculated based on the maximum setpoint change rate (MSCR) installation parameter that is given in ° C./hour.

$$EAR = \frac{3600 \text{ sec}}{MSCR} \times EAO$$

Where EAO is a percentage of EO, this percentage is an installation parameter: EAP can be set from range for example 10 to 70.

$$EAO = \frac{EAP}{100} \times EO$$

Event ramping time (ER) is calculated based on a utility configurable parameter called Event Ramping Percentage (ERP) which enables. This parameter is a number from 0 to 100 that directly sets ER with respect to EL:

$$ER = \frac{ERP}{100} \times EL$$

Figure 5:
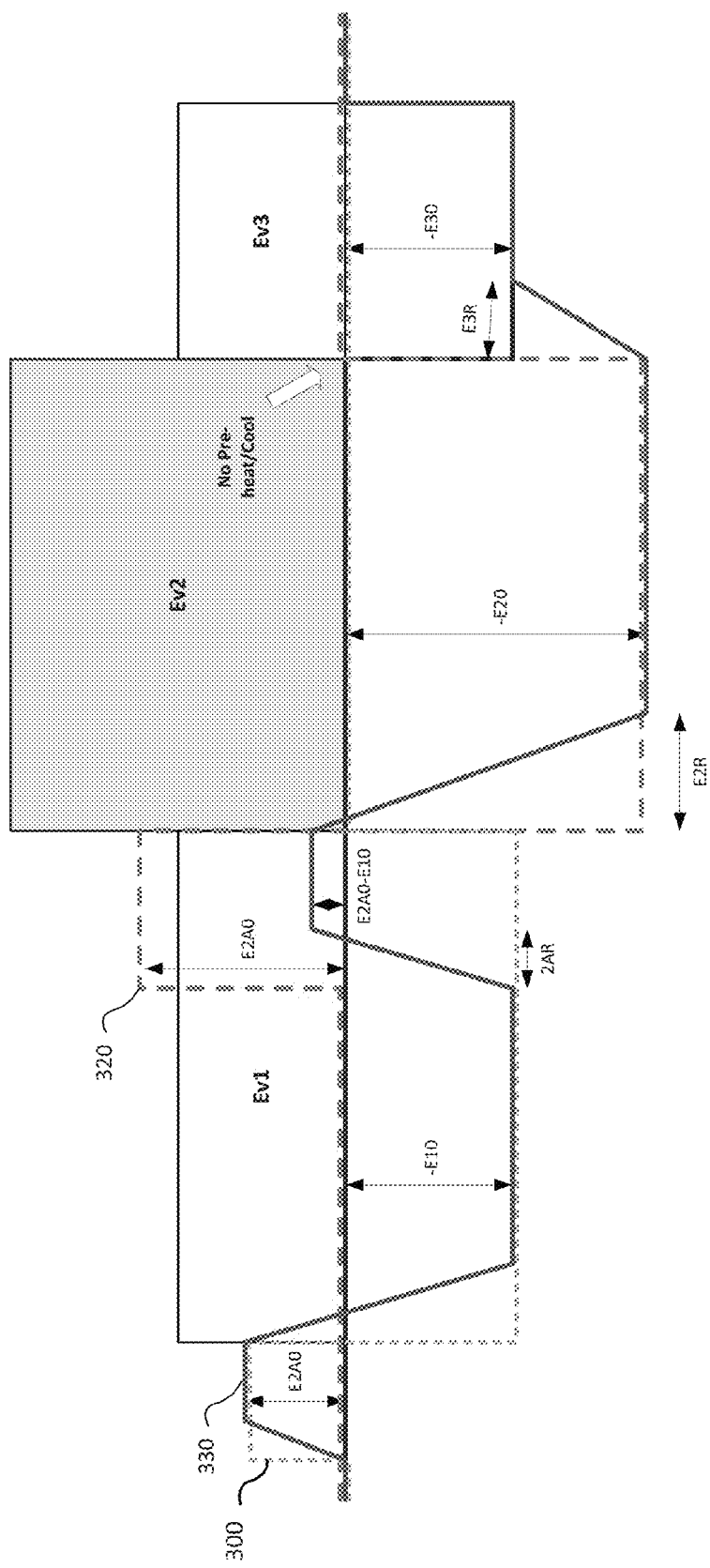
FIG. 5 shows an example consecutive events in a schedule.

Referring to FIG. 5, when two or more events are close or adjacent to each other, the event anticipation of such events, EV1, EV2, EV3, might overlap or conflict with active event conservation offsets. In order to avoid un-expected behavior the following rules need to be respected during final conservation offset calculation.

In order to simplify, for the following rules negative offsets are set to save energy (during events) and positive offsets are set to store energy (before event).

At any given time, if there are two or more future events with none currently active that are calling for a positive offset: The selected offset will be the largest of all, and the time to setpoint (ramping time) will be the one coming from the event generating the select offset.

When all offsets are positive:

Offset=MAX($E1O, E2O, \ldots EnO$)

TTO=TTO(MAX($E1O, E2O, \ldots EnO$))

Since only one event can be active at any given time, only one event can be calling for a negative offset. If one or more events are calling for positive offsets during an active event the selected offset will be the largest of the positive offsets minus the absolute value of the negative offset. The time to setpoint will be the largest between the one coming from the active event and the one coming from the event generating the select positive offset.

Offset=MAX($EO_{pos}1, EO_{pos}2, \ldots, EO_{pos}n$)−|$EO_{neg}$|

TTO=MAX(TTO(MAX($EO_{pos}1, EO_{pos}2, \ldots, EO_{pos}n$),TTO($EO_{neg}$))

As depicted in FIG. 2, before feeding the final temperature setpoints to the control algorithm, a ramping block might smooth the transition between setpoint changes using a ramp calculated based on parameters received from the upper blocks: Schedule, Price/Conservation, and DRLC. These parameters are basically the new target setpoint and the time to reach such setpoint. In order to avoid unexpected behavior, the ramping block:
 when going to a less energy demanding setpoint (lower setpoint on heat mode or higher setpoint on cool mode) the ramping calculations will always use the TTO received from the upper block for the target setpoint (TS).

TTO=$TTO_{TS}$ when going to a more energy demanding setpoint (higher setpoint on heat mode or lower setpoint on cool mode) the ramping calculations will use the minimum TTO resulting from comparing:
  The TTO obtained by using the maximum setpoint change rate (MSCR) installation parameter and the setpoint difference.

$$TTO_{MSCR} = \frac{3600 \text{ secs}}{MSCR} \times (\text{Target Setpoint} - \text{Current Setpoint})$$

The TTO received from the upper block. ($TTO_{TS}$), that is:

TTO=MIN($TTO_{MSCR}, TTO_{TS}$)

Figure 6:
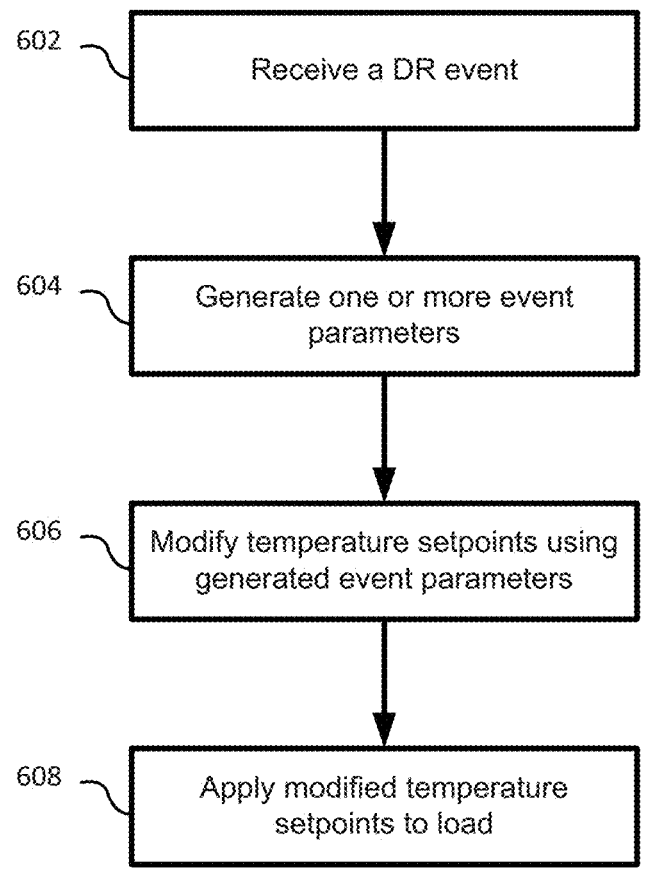
FIG. 6 shows a method of intelligent demand response in a load controller device connected to a load.

FIG. 6 shows a method of a method of intelligent demand response in a load controller device connect to a load. A demand response (DR) event is received at the load controller device such as for example a thermostat coupled to heating and cooling units (602). The load controller device has a schedule containing one or more temperature setpoints or a hold associated with a temperature setpoint. An event offset (EO), an event start (ES) time and event length (EL) can be determined from the DR event. One or more parameters are generated from the DR event (604). The event parameters define anticipation parameters for pre-cool and pre-heating of the building associated with the controller and ramping into the event to adjust peak loading. User defined temperature setpoints in a schedule or hold can be adjusted by the generated event parameters (606). The parameters are generated to provide smooth transition between temperature setpoints and to maximize user comfort during the event but also to shape electricity demand of the load to reduce expected demand subpeak during the DR event. The modified temperature setpoints are applied at their designated time to the control the load.

Figure 7:
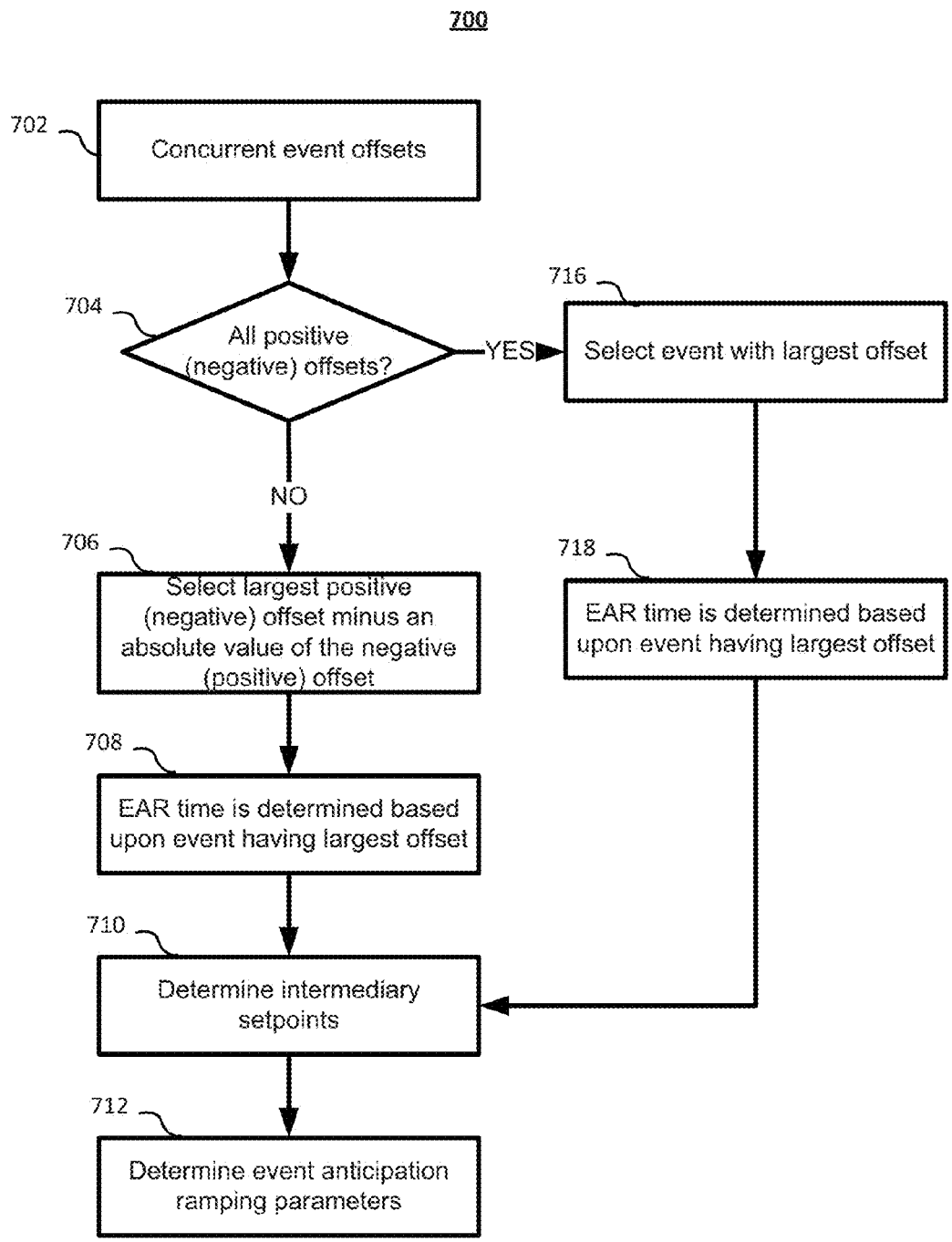
FIG. 7 shows a method of intelligent demand response with anticipation events.

FIG. 7 shows a method of intelligent demand response with concurrent events. Multiple concurrent events can occur based upon one or more DR events or scheduled setpoints at the load controller device (702) as determined by the generated event parameters. If all of the applicable event offsets are positive for pre-heating, negative for pre-cooling (YES at 704) the event with the largest event offset is selected (716). The event anticipation ramping (EAR) time based upon the event having the largest offset in absolute value is selected (718). If not all the event offset are positive for pre-heating, negative for pre-cooling (NO at 704), then at least one event is negative for pre-heating, and at least one event is positive for pre-cooling. From the positive events for pre-heating, negative events for pre-cooling, the events with the largest absolute event offset is selected minus an absolute value of a negative event offset for pre-heating, positive for pre-cooling (706). The event anticipation ramping (EAR) time is determined based upon the event having the largest offset (708). Intermediary setpoints are determined (710) and event anticipation ramping parameters are determined (712).

Although certain methods, apparatus, computer readable memory, and articles of manufacture have been described herein, the scope of coverage of this disclosure is not limited thereto. To the contrary, this disclosure covers all methods, apparatus, computer readable memory, and articles of manufacture fairly falling within the scope of the appended claims either literally or under the doctrine of equivalents.

Although the following discloses example methods, system and apparatus including, among other components, software executed on hardware, it should be noted that such methods, system and apparatus are merely illustrative and should not be considered as limiting. For example, it is contemplated that any or all of these hardware and software components could be embodied exclusively in hardware, exclusively in software, exclusively in firmware, or in any combination of hardware, software, and/or firmware. Accordingly, while the following describes example methods and apparatus, persons having ordinary skill in the art will readily appreciate that the examples provided are not the only way to implement such methods, system and apparatus.

The invention claimed is:

1. A method of intelligent demand response by a load controller device connected to a load, the method comprising:
receiving a demand response (DR) event from a utility providing electricity to the load;
generating one or more event parameters from the DR event to modify one or more temperature setpoints defined in the load controller device, the one or more event parameters associated with at least one pre-heating or pre-cooling temperature setpoints generated in response to receiving the DR event, the one or more event parameters to reduce expected electricity demand subpeaks by the load controller device that would occur from application of the at least one pre-heating and pre-cooling temperature setpoints and the DR event;
modifying the one or more temperature setpoints of the load controller device to provide smooth setpoint transition between temperature setpoints using the generated one or more event parameters to shape electricity demand of the load to reduce an expected demand subpeaks that would occur from application of the DR event and the pre-heating or pre-cooling temperature setpoints; and
applying the modified one or more temperature setpoints at an associated time to control the load;
wherein an event offset (EO), an event start (ES) time and event length (EL) from the DR event are determined, wherein the generating the one or more event parameters comprise an event anticipation offset (EAO) defining a number of degrees that the load controller device should offset a current defined temperature setpoint to pre-cool or pre-heat prior to the ES time and is associated with an event anticipation (EA) time, the EA time defining a length of time that the load controller device should pre-cool or pre-heat before the ES time and the one or more event parameters further comprises determining an event anticipation ramping time (EAR), the EAR for defining an amount of time that the load controller device has to reach EAO from a current temperature setpoint.

2. The method of claim 1 wherein the event parameter changes a temperature setpoint of the load controller device prior to the event start (ES) time.

3. The method of claim 1 wherein the EAR is calculated based on a maximum setpoint change rate (MSCR) installation parameter that is given in °/hour wherein $$EAR = \frac{3600 \text{ sec}}{MSCR} \times EAO.$$

4. The method of claim 3 further comprising determining an event ramping (ER) time, the ER time for determining an amount of time before the EO has to be reached from the ES time.

5. The method of claim 4 wherein a utility configurable parameter is an event ramping percentage (ERP), the ERP used for determining a rate of the ER time.

6. The method of claim 1 where in if there are two or more concurrent anticipation events pending with none currently active that are calling for a positive EO to pre-heating or negative EO for pre-cooling, a selected EO will be a largest absolute value of all EO's, and the EAR time is determined based upon the event having the largest EO.

7. The method of claim 1 where if there are two or more concurrent EOs pending and there is one EO calling for a negative offset in pre-heating, or positive in pre-cooling, and there are one or more EOs calling for a positive offset for pre-heating, negative for pre-cooling, during an active event a selected EO will be a largest of positive offset for pre-heating, negative offset for pre-cooling, minus an absolute value of a negative offset for pre-heating, positive for pre-cooling, and wherein the EAR time is the largest between the active event and the event generating the largest positive offset for pre-heating, or negative for pre-cooling.

8. The method of claim 1 wherein between schedule setpoint changes, one or more additional setpoints are determined between setpoint changes based upon the generated event parameters, the one or more additional setpoints are determined based on maximum setpoint change rate (MSCR) to provide ramping between setpoints.

9. The method of claim 1 wherein the DR event comprises a tier value for determining the EO, wherein the tier is associated with either a pricing value or an offset value.

10. A load controller device for providing intelligent demand response the load controller device comprising:
a load interface for communicating with a load;
a network interface for receiving demand response event from a utility providing electricity to the load;
a temperature sensor for determining a temperature associated with the load; and
a processor coupled to the load interface, network interface and temperature sensor, the processor for controlling the load based by applying temperature setpoints, the processor generating one or more event parameters associated with at least one pre-heating or pre-cooling temperature setpoints generated in response to the DR event and modifying one or more temperature setpoints of the load controller device to provide smooth setpoint transition between temperature setpoints using the generated one or more event parameters to shape electricity demand of the load to reduce expected electricity demand subpeaks that would occur from application of the at least one pre-heating or pre-cooling temperature setpoint and the DR event to the one or more temperature setpoints of the load controller device;
wherein an event offset (EO), an event start (ES) time and event length (EL) from the DR event are determined wherein the generating the one or more event parameters comprise an event anticipation offset (EAO), the event anticipation offset defining a number of degrees that the load controller device should offset a current defined temperature setpoint to pre-cool or pre-heat prior to the ES time, the EAO is associated with an event anticipation (EA) time, the EA time defining a length of time that the load controller device should pre-cool or pre-heat before the ES time and the one or more event parameters further comprises determining an event anticipation ramping time (EAR), the EAR for defining an amount of time that the load controller device has to reach EAO from a current temperature setpoint.

11. The load controller device of claim 10 wherein the EAR is calculated based on a maximum setpoint change rate (MSCR) installation parameter that is given in °/hour wherein $$EAR = \frac{3600 \text{ sec}}{MSCR} \times EAO.$$

12. The load controller device of claim 11 further comprising determining an event ramping (ER) time, the ER time for determining an amount of time before the EO has to be reached from the ES time.

13. The load controller device of claim 12 wherein a utility configurable parameter is an event ramping percentage (ERP), the ERP used for determining a rate of the ER time.

14. The load controller device of claim 10 where in if there are two or more concurrent anticipation events pending with none currently active that are calling for a positive EO to pre-heating or negative EO for pre-cooling, a selected EO will be a largest absolute value of all EO's, and the EAR time is determined based upon the event having the largest EO.

15. The load controller device of claim 10 where if there are two or more concurrent EOs pending and there is one EO calling for a negative offset in pre-heating, or positive in pre-cooling, and there are one or more EOs calling for a positive offset for pre-heating, negative for pre-cooling, during an active event a selected EO will be a largest of positive offset for pre-heating, negative offset for pre-cooling, minus an absolute value of a negative offset for pre-heating, positive for pre-cooling, and wherein the EAR time is the largest between the active event and the event generating the largest positive offset for pre-heating, or negative for pre-cooling.

16. The load controller device of claim 10 wherein between schedule setpoint changes, one or more additional setpoints are determined between setpoint changes based upon the generated event parameters, the one or more additional setpoints are determined based on maximum setpoint change rate (MSCR) to provide ramping between setpoints.

17. The load controller device of claim 10 wherein the load controller device is a thermostat and the load is heating ventilation and cooling (HVAC) equipment.

18. A computer readable memory containing instructions when executed by a processor provide intelligent demand response by a load controller device connected to a load, the instructions for:
receiving a demand response (DR) event from a utility providing electricity to the load;
generating one or more event parameters from the DR event to modify one or more temperature setpoints defined in the load controller device, the one or more event parameters associated with at least one pre-heating or pre-cooling temperature setpoints generated in response to receiving the DR event, the one or more event parameters to reduce expected electricity demand subpeaks by the load controller device that would occur from application of the at least one pre-heating and pre-cooling temperature setpoints and the DR event;
modifying the one or more temperature setpoints of the load controller device to provide smooth setpoint transition between temperature setpoints using the generated one or more event parameters to shape electricity demand of the load to reduce expected electricity demand subpeaks that would occur from pre-heating or pre-cooling temperature setpoints generated prior to application of the DR event; and
applying the modified one or more temperature setpoints at an associated time to control the load;
wherein the DR event is for determining an event offset (EO), an event start (ES) time and event length (EL) from the DR event, wherein the generating the one or more event parameters comprise an event anticipation offset (EAO) defining a number of degrees that the load controller device should offset a current defined temperature setpoint to pre-cool or pre-heat prior to the ES time and is associated with an event anticipation (EA) time, the EA time defining a length of time that the load controller device should pre-cool or pre-heat before the ES time and the one or more event parameters further comprises determining an event anticipation ramping time (EAR), the EAR for defining an amount of time that the load controller device has to reach EAO from a current temperature setpoint.

* * * * *